United States Patent
Roland (10) Patent No.: US 11,345,352 B2
(45) Date of Patent: May 31, 2022

(54) METHOD FOR OPERATING A DRIVETRAIN OF A MOTOR VEHICLE, IN PARTICULAR A CAR

(71) Applicant: AUDI AG, Ingolstadt (DE)

(72) Inventor: Sven Roland, Ingolstadt (DE)

(73) Assignee: AUDI AG, Ingolstadt (DE)

(*) Notice: Subject to any disclaimer, the term of this patent is extended or adjusted under 35 U.S.C. 154(b) by 363 days.

(21) Appl. No.: 16/619,673

(22) PCT Filed: Aug. 1, 2018

(86) PCT No.: PCT/EP2018/070873
§ 371 (c)(1),
(2) Date: Dec. 5, 2019

(87) PCT Pub. No.: WO2019/025489
PCT Pub. Date: Feb. 7, 2019

(65) Prior Publication Data
US 2020/0164883 A1    May 28, 2020

(30) Foreign Application Priority Data

Aug. 4, 2017   (DE) ..................... 10 2017 213 611.1

(51) Int. Cl.
*B60W 30/19*     (2012.01)
*B60W 50/038*    (2012.01)
(Continued)

(52) U.S. Cl.
CPC ............ *B60W 30/19* (2013.01); *B60W 10/11* (2013.01); *B60W 50/038* (2013.01);
(Continued)

(58) Field of Classification Search
CPC .... B60W 30/19; B60W 10/11; B60W 50/038; B60W 50/045; B60W 2050/0027;
(Continued)

(56) References Cited

U.S. PATENT DOCUMENTS

| 4,763,545 A | 8/1988 | Shibayama et al. |
| 6,364,812 B1* | 4/2002 | Robichaux ............ F16H 61/061 477/160 |

(Continued)

FOREIGN PATENT DOCUMENTS

| CN | 101878386 A | 11/2010 |
| CN | 102272489 A | 12/2011 |

(Continued)

OTHER PUBLICATIONS

Office Action dated Sep. 2, 2020 in corresponding Chinese Application No. 2018800478448.8; 13 pages including English-language translation.

(Continued)

*Primary Examiner* — Tisha D Lewis
(74) *Attorney, Agent, or Firm* — Maier & Maier, PLLC (57) ABSTRACT

A method for operating a drivetrain of a motor vehicle including at least one drive motor, a transmission device and at least one wheel which can be driven by the drive motor via the transmission device, in which respective actuations of respective shifting elements of the transmission device are brought about in order to influence thereby a transfer of a torque provided by the drive motor from the drive motor to the wheel via the transmission device, wherein—the torque provided by the drive motor is set as a function of a transfer function which indicates a factor by which the torque is to be multiplied, in order to calculate a wheel torque resulting from the torque and from the transfer and acting on the wheel.

9 Claims, 2 Drawing Sheets

(51) Int. Cl.
- *B60W 50/04* (2006.01)
- *F16H 59/14* (2006.01)
- *B60W 10/11* (2012.01)
- *F16H 61/68* (2006.01)
- *B60W 50/00* (2006.01)

(52) U.S. Cl.
CPC ........... *B60W 50/045* (2013.01); *F16H 59/14* (2013.01); *F16H 61/68* (2013.01); *B60W 2050/0027* (2013.01); *B60W 2050/0039* (2013.01); *B60W 2510/1005* (2013.01); *B60W 2710/0666* (2013.01)

(58) Field of Classification Search
CPC . B60W 2050/0039; B60W 2510/1005; B60W 2710/0666; F16H 59/14; F16H 61/68
See application file for complete search history.

(56) References Cited

U.S. PATENT DOCUMENTS

| | | | | |
|---|---|---|---|---|
| 7,740,558 | B2 * | 6/2010 | Matsumura | ........... F16H 61/688 477/79 |
| 2012/0216640 | A1 | 8/2012 | Hoffmeister et al. | |
| 2015/0127231 | A1 | 5/2015 | Maurer et al. | |
| 2016/0257197 | A1 * | 9/2016 | Fader | ....... F16H 61/16 |
| 2019/0039595 | A1 * | 2/2019 | Hawley | ............... B60L 15/2018 |

FOREIGN PATENT DOCUMENTS

| | | |
|---|---|---|
| CN | 102439334 A | 5/2012 |
| CN | 102785665 A | 11/2012 |
| CN | 102951155 A | 3/2013 |
| CN | 104972891 A | 10/2015 |
| DE | 195 04 847 A1 | 9/1995 |
| DE | 100 27 332 A1 | 12/2000 |
| DE | 100 21401 A1 | 12/2000 |
| DE | 101 05 507 A1 | 10/2001 |
| DE | 10 2006 001 900 A1 | 7/2007 |
| DE | 10 2008 000 209 A1 | 8/2009 |
| DE | 10 2011 079 888 A1 | 1/2013 |
| DE | 10 2013 219 922 A1 | 4/2015 |
| DE | 10 2014 219 598 A1 | 3/2016 |
| DE | 10 2015 205 925 A1 | 10/2016 |

OTHER PUBLICATIONS

Examination Report dated Mar. 28, 2018 in corresponding German application No. 10 2017 213 611.1; 12 pages including Machine-generated English-language translation.
International Search Report dated Oct. 19, 2018 in corresponding International application No. PCT/EP2018/070873; 32 pages including Machine-generated English-language translation.
Chinese Office Action dated Apr. 8, 2021, in connection with corresponding CN Application No. 201880047844.8 (8 pp., including machine-generated English translation).
English-language translation of International Preliminary Report on Patentability dated Feb. 13, 2020, in corresponding International Application No. PCT/EP2018/070873; 8 pages.

* cited by examiner

METHOD FOR OPERATING A DRIVETRAIN OF A MOTOR VEHICLE, IN PARTICULAR A CAR

FIELD

The disclosure relates to a method for operating a drivetrain of a motor vehicle.

BACKGROUND

Such methods for operating drivetrains of motor vehicles, in particular cars, are already well known from the general prior art in particular from series vehicle production. The respective drivetrain here includes, for example, a drive motor designed, in particular, as a combustion engine, in particular a piston combustion engine, as well as at least one wheel. Usually, the drivetrain includes several wheels. The drivetrain furthermore includes a transmission device, via which the wheel or the wheels can be driven by the drive motor. In the respective method for operating such a drivetrain, for example, respective actuations of respective shifting elements of the transmission device are brought about in order to influence a transfer of a torque provided by the drive motor from the drive motor to the wheel via the transmission device to the wheel. By the respective bringing about of the respective actuation of the respective shifting element, a gear change of the transmission device can be brought about, for example, whereby the transfer of the torque from the drive motor to the wheel is influenced. In the context of such a gear change, for example, there is a shift from a first gear into a second gear of the transmission device, wherein the gears differ from one another in their respective gear ratios.

Moreover, DE 195 04 847 A1 discloses a method for controlling a torque transfer system with or without power split, in particular for motor vehicles.

From DE 10 2011 079 888 A1 a method is known for determining an operating state of a device via which piston displacements of a first hydraulic machine and of a second hydraulic machine can be varied.

In addition, from DE 100 27 332 A1, a method for the detection of at least one predetermined gear shift position of a transmission device can be obtained as known.

SUMMARY

The aim of the present invention is to further develop a method of the type mentioned at the start in such a manner that a particularly comfortable and as at the same time a particularly reliable operation of the drivetrain can be implemented.

In the method according to the invention, a drivetrain of a motor vehicle, in particular a car, preferably a passenger car, is operated, wherein the drivetrain comprises at least one drive motor, a transmission device and at least one wheel which can be driven by the drive motor via the transmission device. The drive motor is, for example, designed as a combustion engine, in particular a piston combustion engine. In particular, it is conceivable that the drivetrain comprises multiple wheels. The wheels or the wheel can be driven by the drive motor, whereby, for example, the motor vehicle overall is driven by the drive motor.

In the method, respective actuations of respective shifting elements of the transmission device are brought about in in order to influence thereby a transfer of a torque, also referred to as a drive torque, engine torque or machine torque, from the drive motor to the wheel or wheels via the transmission device.

Then, in order to be able to implement a particularly comfortable and particularly reliable operation of the drivetrain and thus of the motor vehicle overall, it is provided according to the invention that the torque provided by the drive motor is set as a function of a transfer function which indicates a factor by which the torque (engine torque) is to be multiplied, in order to calculate a wheel torque, in particular a total wheel torque, resulting from the torque and from the transfer of the torque from the drive motor to the wheel and acting on the wheel.

Furthermore, in the method according to the invention it is provided that respective parameters are determined, which characterize respective states of the respective shifting elements, which result from the bringing about of the actuations. In addition, according to the invention, it is provided that the transfer function or the factor is monitored as a function of the determined parameters.

The drive motor comprises, for example, a driveshaft designed in particular as a crankshaft, via which the drive motor provides or can provide the torque which is also referred to as drive machine torque. Here, for example, the drive machine torque should be multiplied by the factor in order to calculate the total wheel torque. The factor is thus, for example, a physical factor which can be calculated, for example, in that a transmission output torque is divided by a transmission input torque, in particular including a so-called conversion factor. The transmission input torque corresponds, for example, to the drive machine torque (torque provided by the drive motor), since, for example, the drive machine torque is transferred to the transmission device and introduced into the transmission device, so that the transmission input torque is introduced into the transmission device. The transmission output torque corresponds, for example, to the wheel torque and results, in particular, from the transfer of the drive machine torque from the drive motor to the wheel via the transmission device. In the context of the transfer, for example, the drive machine torque (transmission input torque) is converted by means of the transmission device into the wheel torque or transmission output torque, in particular in such a manner that the drive machine torque or the transmission input torque and the wheel torque or the transmission output torque have torque values which differ from one another.

For example, during a gear change which is carried out in the transmission device, in particular in a transmission of the transmission device, for example, the factor changes, in particular at least substantially continuously, from an actual transfer ratio to a setpoint or target transfer ratio. Here, the gear change is brought about or carried out, for example, by bringing about the actuations of the shifting elements. Preferably, the gear change is carried out with an overlap, so that, for example, a first of the shifting elements, which is designed as a first clutch, is opened, while a second of the shifting elements, which is designed as a second clutch, is closed. Such a gear change with overlap is already well known and is carried out, for example, in an automatic torque converter transmission, for example, in order to carry out the gear change comfortably and thus with little or no jerking.

Usually, the factor together with the described change from the actual transfer ratio to the target transfer ratio cannot be calculated or can only be calculated qualitatively, since the drivetrain is usually not equipped with a sufficient number of sensors, whereby, however, the weight and the costs of the drivetrain can be kept low. Therefore, according to the invention, the mentioned parameters are used in order to monitor the transfer function or the factor. In particular, the invention is based on the finding that the transfer function or a transfer behavior resulting from the transfer function, which characterizes the transfer of the torque from the drive motor to the wheel via the transmission device, cannot be formed or cannot be formed, respectively checked or monitored, only on the basis of speed ratios, since the transfer behavior is used for a torque calculation and is thus used for the setting of the torque provided by the drive motor.

The drive machine torque is set, for example, based on a requirement or a desire of the driver of the motor vehicle, wherein this requirement or this desire of the driver is also referred to as driver desire. The determination of the driver desire of the torque is usually determined at the machine level and, here, based on an accelerator pedal value and on the basis of the speed of the drive motor, in particular of the drive shaft. The accelerator pedal value here characterizes a position of an accelerator pedal, by means of which the driver can set the torque to be provided by the drive motor.

By the method according to the invention, the determination of the driver desire can then occur at the wheel level, so that an at least nearly wheel torque-neutral gear change can be implemented, that is to say a shifting which is at least nearly wheel torque-neutral and thus with little or no jerking. In order, for example, to set the torque to be provided by the drive motor to the or in accordance with the driver desire, the driver desire is considered to be a desired wheel torque acting on the wheel and divided, for example, by the transfer function, in order to implement thereby a particularly comfortable operation, in particular a particularly comfortable gear change. This concept can also be used, for example, in the context of an electronic stability program (ESP), in particular in the case in which there is a requirement for a regenerative braking torque of an electric machine, as well as in the case in which there is a requirement of thrust regeneration torque on the electric machine.

As a possible disadvantage of the above-described, at least nearly wheel torque-neutral shifting, it has been identified that the transfer function is in principle adjusted to a shifting behavior. This means that, for example, during a gear change, excessive jerking should be prevented or should be intentionally caused or brought about. However, here it cannot be detected whether, for example, a signal, in particular an electric signal, transmitted via a data bus, for carrying out the at least almost wheel torque-neutral shifting has an excessive deviation from a transfer ratio physically present in the transmission device. In particular, it can be disadvantageous here if an excessively low transfer ratio is determined or set, although physically a comparatively higher transfer ratio has been set in the transmission device. Consequently, the drive machine torque also referred to as machine torque can be set to a disadvantageous torque value, which can entail adverse effects. An example of this can be that the transfer ratio for an eighth gear of the transmission device is transmitted, although physically the transmission device is engaged in a second gear.

The above-described disadvantage, which is possible in principle, can then be avoided or compensated by the method according to the invention, since the transfer function or its setting is monitored as a function of the mentioned parameters. In this manner, it is possible to make the transfer function plausible. For example, if an error of the transfer function, in particular an unfavorable value of the transfer function, is detected, then the transfer function can be converted or capped to a safer value, that is to say limited, in particular, for example, if the error is continuously present during a predetermined time span. In this manner, a particularly reliable operation of the drivetrain can be implemented, since adverse effects such as, for example, accelerations can be avoided. Since, for the monitoring of the transfer function, use is made of the parameters and, via said parameters, of the states of the shifting elements, a particularly robust monitoring and design can be implemented, in particular requirements for maximum decelerations in a regeneration case of the drivetrain can be met.

It has been shown to be particularly advantageous if, during the monitoring of the transfer function, its value is influenced, in particular set or limited to a setpoint value, as a function of the determined parameters. Thereby, values of the transfer function which cause unfavorable adverse effects can be avoided, whereby a particularly reliable operation can be implemented.

An additional embodiment is characterized in that, as a function of the parameters, at least one check value is determined, with which an actual value of the transfer function is compared. The actual value of the transfer function or of the factor should be understood, in particular, to be a value which the transmission function or the factor initially has and which, for example, can be changed, so that, for example, it is possible to change the actual value to the setpoint value.

Here it has been shown to be particularly advantageous if the value of the transfer function is influenced if a difference between the actual value and the check value exceeds a predeterminable threshold value. The background of this embodiment is the tolerance of slight deviations of the transfer function or of the factor, in particular of the actual value, from the check value, since such slight deviations do not lead to adverse driving states. However, if the actual value deviates excessively from the check value, then the transfer function or the factor is influenced in particular in such a manner that the transfer function or its value is set to the setpoint value or so that the transfer function or the factor is limited or capped. In particular, setting of the transfer function or of the value of the transfer function to the setpoint value is to be understood to mean that the actual value initially set, for example, is set or changed to the setpoint value. Thereby, a reliable state of the drivetrain can be set in a targeted manner.

Here, by the tolerance of slight deviations of the actual value from the check value, unnecessary and in particular unnecessarily often occurring influences of the transfer function or factor can be avoided, so that, in predominant operating ranges of the drivetrain, a comfortable operation can be implemented.

In order to implement a particularly reliable and comfortable operation, it is provided, in an additional embodiment of the invention, that the value of the transfer function or of the factor is influenced if a time span, also referred to as error tolerance time, during which the difference continuously exceeds the threshold value, exceeds a predeterminable time limit. For example, if the excessive deviation of the actual value from the check value occurs only very briefly, then this may be, for example, a brief overshooting and/or an error indication here. In order to avoid influences of the transfer function or the factor, which result from such brief overshootings or error indications and which are thus adverse, and, in order to influence the transfer function if and only if the excessive deviation of the actual value from the check value is actually present, it is then provided to influence the transfer function as a function of the error tolerance time. Preferably, the error tolerance time is at least 100 milliseconds, in particular at least 200 milliseconds and preferably at least 300 milliseconds. It has been shown to be particularly advantageous if the error tolerance time is 300 milliseconds. Preferably, the error tolerance time is less than 500 milliseconds, in particular less than 400 milliseconds.

The mentioned threshold value is, for example, 30 percent of the check value, so that, for example, the transfer function is then influenced if the actual value is more than 1.3 times or less than the 0.7 times the check value.

An additional embodiment is characterized in that, as a function of the parameters, at least one gear ratio of the transmission device, resulting from a gear engaged in the transmission device, and, in particular, in the transmission, is determined. On the basis of the parameters, it can then be detected, for example, whether and if so which shifting elements are opened or closed. In particular, using the parameters, it can be detected whether the bringing about of the actuations was successful, that is to say whether the bringing about of the actuations led to a desired setpoint state of the respective shifting element. The bringing about of the actuations occurs, for example, by an appropriate actuating, in particular open-loop control or closed-loop control, of the shifting elements, in particular of valve elements of the shifting elements. The bringing about of the actuations leads, for example, to the respective desired setpoint state of the respective shifting element, when the drivetrain is functional and thus does not exhibit an error function.

However, if an error occurs, then, for example, in spite of the bringing about of the actuation, that is to say in spite of the actuating, possibly in at least one of the shifting elements, the desired setpoint state of the one shifting element does not occur, so that, for example, at least the one shifting element remains open although it should be closed, or so that, for example, at least the one shifting element remains closed although it should be opened. In other words, it is possible, using the parameters, to acquire reactions of the valve elements to the bringing about of the actuations, so that it can be detected whether the respective state of the respective shifting element, which is characterized by the respective parameters, corresponds to the desired setpoint state or to an error state different from the desired setpoint state of the respective shifting element.

By the determining of the state, it can be determined whether and indeed if a particular gear of the transmission device or of the transmission is engaged, so that, subsequently, the gear ratio of the engaged gear or a gear ratio of the transmission device, resulting from the engaged gear, can be determined. The gear ratio is stored, for example, in a storage device, in particular in a characteristic diagram stored in the storage device.

Here, it has been shown to be particularly advantageous if the gear ratio is used as the check value. Thereby, for example, for the following reasons, a particularly reliable operation can be ensured: first, for example, the gear ratio or the factor is set or predetermined assuming that the drivetrain is error free, so that the gear ratio or the factor has, for example, a first value. If the drivetrain is error free, the use of this first value then leads to a desired shifting behavior, so that, for example, a gear change with little or no jerking occurs. This is the case, for example, since, in the case of an error-free drivetrain, the bringing about of the actuations leads or has led to the respective setpoint states of the shifting elements, whereby, for example, a desired setpoint gear will be or is inserted in fact in the transmission device or in the transmission. Then, the first value of the transfer behavior advantageously corresponds to the actually engaged gear, and, an advantageous gear change can be carried out.

For example, due to an error, it can occur—as previously described—that the bringing about of the actuations in at least one of the shifting elements does not lead or has not led to the desired setpoint state, so that, for example, not the desired setpoint gear but rather another gear different from the setpoint gear will be or is engaged. If the drive machine torque were then to be set on the basis of the first value of the transfer function, while not the desired setpoint gear but rather the other gear is engaged, an unfavorable gear change or unfavorable effects could occur.

However, using the parameters, it can then be detected that at least one of the shifting elements is not in the desired setpoint state. In particular, it can be detected that not the desired setpoint gear but the other gear different from the setpoint gear is engaged. Subsequently, for example, the transfer function is influenced in such a manner that the initially set first value of the transfer function is set to a second value different therefrom. By setting the second value, for example, adverse effects which could occur while maintaining the first value can be avoided, so that in spite of the circumstance that not the desired setpoint gear but rather the other gear different therefrom is engaged, unfavorable effects can be avoided. This embodiment is based in particular on the finding that, in particular, the gear which has actually been engaged in the transmission or its gear ratio strongly influences the transfer of the torque from the drive motor to the wheel and thus the wheel torque acting on the wheel.

In a particularly advantageous embodiment of the invention, the monitoring of the transfer function is suspended if the transmission device is incapable of transferring a predeterminable torque of, for example, 50 newton meters or more. In other words, for example, if a highest torque transferrable by the transmission device from the drive motor to the wheel undershoots a limit torque, then the monitoring of the transfer function is suspended, since then, for example, a torque or traction in the transmission device is interrupted or opened. This can occur in that at least one clutch of the transmission device is opened, so that only torques lower than the predeterminable torque can be transferred via the transmission device. In other words, for example, the transfer function is then and only then monitored if the transmission device is capable of transferring the predeterminable torque and torques greater than the predeterminable torque, since then, for example, in the transmission device, a sufficient traction exists or is applied. In this embodiment, a monitoring suppression is thus provided. This monitoring suppression is understood to mean that the monitoring of the transfer function is suspended if the transmission device is incapable of transferring the predeterminable torque.

An additional embodiment is characterized in that the respective parameter includes an electrical current resulting from the respective bringing about of the respective actuation and flowing through the respective shifting element. In other words, the result, for example, of the bringing about of the respective actuation, that is to say, for example, of the aforementioned actuating of the respective shifting element, is an electrical current which flows through the respective shifting element. For example, if it is acquired that the electrical current is within a normal range and thus, for example, undershoots an upper limit and exceeds a lower limit, then it can be concluded therefrom that the respective shifting element has the desired setpoint state or can reach the desired setpoint state. However, for example, if it is determined, in particular acquired, that the electrical current exceeds the upper limit or undershoots the lower limit, then it can be concluded that there is an error of the drivetrain and in particular that the bringing about of the respective actuation has not led to the desired outcome, and that the respective shifting element, for example, has not assumed the desired setpoint state or has not reached the desired setpoint state. In other words, in this embodiment, a current-based detection of the respective state of the respective shifting element is provided. In combination with the previously described determination of the gear ratio or of the engaged gear, for example, a current-based gear determination is thus provided, based on which the transfer function or the factor is monitored and in particular influenced.

Finally, it has been shown to be particularly advantageous if the respective shifting element comprises at least one valve, the actuation of which is brought about, for example. The valve is, for example, a magnetic valve or an electrically operated valve, so that, for example, in particular if the shifting element or the valve is error-free, the result of the respective bringing about of the respective actuation is a current different from zero which flows through the valve, in particular through its coil.

Additional advantages, features and details of the invention result from the following description of a preferred embodiment example and from the drawing. The features and feature combinations mentioned in the description as well as the features and feature combinations mentioned below in the figure description and/or shown only in the figures can be used not only in the respective indicated combination, but also in other combinations or individually, without exceeding the scope of the invention.

DETAILED DESCRIPTION

In the Fig., identical or functionally equivalent elements are provided with identical reference numerals.

Below, in reference to the Fig., a method for operating a drivetrain of a motor vehicle, in particular a car such as, for example, a passenger car, is explained. The drivetrain here comprises at least one drive motor, a transmission device and at least one wheel which can be driven by the drive motor via the transmission device. The drive motor is, for example, a combustion engine, in particular a piston combustion engine, wherein the drive motor comprises, for example, a drive shaft designed in particular as a crankshaft. Via the drive shaft, the drive motor can also provide torques referred to as machine torques or drive machine torques, which can be transferred via the transmission device to the wheel. For this purpose, for example, the respective torque provided by the drive motor via the drive shaft, in particular via a transmission input shaft, is introduced into the transmission device, in particular into a transmission of the transmission device, so that, for example, the torque provided by the drive motor corresponds to a transmission input torque. The transmission device provides, for example, a transmission output torque resulting from the torque provided by the drive motor, which corresponds, for example, to a wheel torque acting on the wheel and thus at the wheel level.

The transmission here comprises multiple shifting elements, wherein, in the context of the mentioned method for operating the drivetrain, respective actuations of the respective shifting elements are brought about. In the context of the respective bringing about of the respective actuation, for example, the respective shifting element is actuated, in particular open-loop or closed-loop controlled. The respective shifting element can be designed, for example, as a brake or clutch, in particular as a traction or a positive clutch, wherein the respective shifting element comprises, for example, at least one valve. By means of the respective valve, for example, a flow of a fluid, in particular a liquid, can be influenced or set, wherein, via the respective valve, by the actuating of the shifting element, the flow of the fluid is influenced. The respective valve is, for example, an electrically operated valve, which is also referred to as electric valve. If the respective shifting element is, for example, error-free, then the result of the actuating, for example, is an electrical current which flows through the valve, in particular through a coil of the valve, and which lies, for example, within a normal range. Subsequently, at least temporarily, a desired setpoint state of the valve and thus of the shifting element overall results, for example, from the respective bringing about of the respective actuation, that is to say from the actuating.

If the respective shifting element or the respective valve has, for example, an error, then the result, for example, of the respective actuating is no current flow through the valve, or that the electric current flowing through the valve lies outside of the normal range. Subsequently, the respective valve and thus the respective shifting element reaches or remains in an error state different from the desired setpoint state. The respective setpoint state and the respective error state are jointly referred to also as states.

The respective actuations of the respective shifting elements are brought about in order to influence thereby a transfer of the respective torque provided by the drive motor from the drive motor to the wheel via the transmission device. By the actuating of the shifting elements, a gear change can be carried out, for example. Here, for example, the transmission device comprises at least one transmission which comprises multiple shiftable or engageable gears with respective gear ratios. Here, for example, the gears differ in their gear ratios. A gear change, which is also referred to as shifting, is understood to mean, for example, that a first gear of the transmission, which was initially engaged, has been disengaged and thus deactivated, and a second gear of the transmission, which was initially disengaged or deactivated, has been engaged and thus activated. For this purpose, for example, a first clutch is opened and a second clutch is closed, wherein, for example, the first clutch is a first of the shifting elements and the second clutch is a second of the shifting elements. Preferably, such a gear change occurs with overlap, so that, for example, the first clutch is opened while the second clutch is closed or vice versa. Thereby, a comfortable gear change can be carried out.

The transmission is here, for example, designed as an automatic transmission and it can comprise a hydrodynamic torque converter, also referred to simply as converter. Thus, the transmission is designed, for example, as an automatic converter transmission which is also referred to as automatic converter or automated converter. Furthermore, it is conceivable that the transmission device also comprises a differential referred to as axle drive, via which, for example, the respective torque is transmitted or distributed onto wheels of the drivetrain, which are spaced apart from one another in vehicle transverse direction.

Upshifting of the transmission is understood to mean, for example, that the first gear is disengaged and the second gear, which is higher compared to the first gear, is engaged. Downshifting is understood to mean, for example, that the second gear is disengaged and the first gear, which is lower compared to the second gear, is engaged. Here, for example, the gear ratio of the second gear is lower than the gear ratio of the first gear, so that, for example, in the course of an upshifting, the gear ratio of the transmission is reduced, wherein, in the course of a downshifting, the gear ratio is increased. Here, for example, the transmission comprises eight shiftable gears or gear stages.

Figure 1:
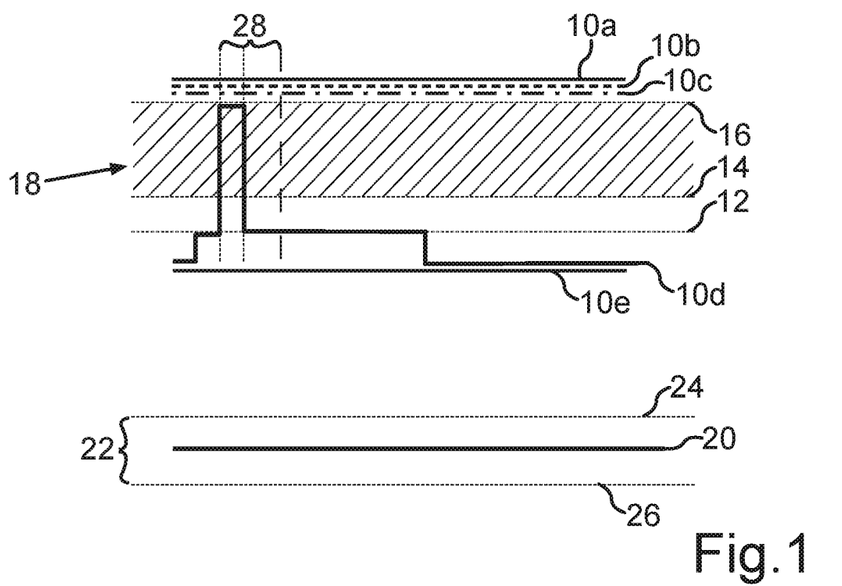
FIG. 1 a diagram for illustrating an inventive method for operating a drivetrain of a motor vehicle.

FIG. 1 shows a diagram in which courses 10a-e are recorded. The courses 10a-e here are respective current courses which illustrate the respective above-described electrical currents resulting from the bringing about of the actuations and flowing through the shifting elements, so that, for example, at least five shifting elements are provided.

Furthermore, so-called current thresholds 12, 14, and 16 are recorded in the diagram shown in FIG. 1, which are respective threshold values or limits for the respective electrical currents.

In order then to implement a particularly reliable and comfortable operation of the drivetrain, it is provided in the context of the invention that the torque (drive machine torque) provided by the drive motor is set as a function of a transfer function which gives a factor by which the torque provided by the drive motor via the drive shaft is to be multiplied, in order to calculate the above-described wheel torque resulting from the torque and from the transfer of the torque from the drive motor to the wheel via the transmission device and acting on the wheel. In the above-described gear change, the drive machine torque is set with overlap in the described manner, so that, in the context of the method, it is not, for example, a speed-based shifting that is carried out, but instead, in comparison to conventional methods, a conversion from a speed-based shifting to an at least almost wheel torque-neutral shifting is provided, which is also referred to as master shift. In the course of the wheel torque-neutral shifting, the drive motor, in accordance with the transfer function, also referred to as transmission transfer function, adjusts its drive machine torque, also referred to as clutch torque, in order, for example, in particular during the gear change or during the shifting, to keep the wheel rotational moment, which is also referred to simply as wheel torque, at least substantially constant. As a result, an at least almost jerk-free shifting is implemented, since, for example, excessive torque increases or an excessive torque decrease on the wheel can be prevented.

The transfer function or the factor, in particular its respective value, is here adjusted, for example, to the respective gear change and is predetermined in particular as a function of the gear into which one is shifting or changing. If the drivetrain is then error-free, then the respective actuating brings about the respective setpoint state of the respective shifting element, so that the respective shifting element reaches its respective setpoint state or is in its respective setpoint state. Subsequently, a shifting to a desired setpoint gear occurs, wherein such a shifting in combination with the transfer function leads to an advantageous shifting. However, if an error of the drivetrain then occurs, so that in spite of the actuation of the shifting elements, one or more of the shifting elements or all the shifting elements do not reach the desired setpoint state, but instead reach an error state or remain in an error state, then, for example, a shifting to the desired setpoint gear does not occur, but instead, for example, a shifting into another gear different from the setpoint gear occurs, or the transmission remains in another gear different from the setpoint gear. In the case of such an error of the drivetrain, the transfer function adjusted to the setpoint gear would then lead to adverse effects, which, however, can then be avoided by the method.

For this purpose, it is provided that respective parameters are determined, which characterize respective states of the respective shifting elements, which result from the bringing about of the actuation, and the transfer function is monitored and in particular influenced as a function of the determined parameters. The respective parameter here comprises the above-described electric current, so that, based on the respective electric currents, the transfer function is monitored. In particular, based on the electric currents, the gear which is currently engaged in the transmission or a gear ratio of the transmission device, which results from the engaged gear, can be determined. For example, if the determined gear differs from the setpoint gear, then the transfer function can be changed, for example, assuming an initially set actual value, to an advantageous setpoint value, or the transfer function is capped or limited so that, for example, adverse effects resulting from the above-described error of the drivetrain can be avoided.

Consequently, an error in the transfer function can lead to an unfavorable wheel torque, as a result of which, for example, adverse effects such as, for example, jerk-like movements can occur. In particular, the following error cases should be considered:

In the a first of the error cases, the transfer function changes the drive machine torque erroneously, in that, for example, the incorrect gear is transmitted to the motor control device. Here, for example, instead of the second gear, the fourth gear is transmitted, whereby the wheel torque becomes excessively high.

In the second error case, the transmission gear ratio changes erroneously, and the transmitted transfer function remains unchanged. This occurs, for example, if in the transmission an erroneous changing from the third gear to the second gear occurs, and the transfer function moreover continues to transmit the third gear or starts from the third gear. This also results directly in an excessively high wheel torque.

Disadvantageous values of the wheel torque can lead to undesired accelerations, whereby, for example, an uncomfortable, that is to say jerk-like ride occurs. For example, in a regeneration or coasting, undesired decelerations of the motor vehicle can occur. However, since the transfer function is then monitored in the described manner, excessively erroneous wheel torques and thus excessively high accelerations and excessively high decelerations can be avoided.

Furthermore, in the diagram shown in FIG. 1, for example, a monitoring range 18 is recorded, which, for example, extends continuously from the current threshold 14 up to the current threshold 16 or vice versa. In addition, a course 20 recorded in the diagram shown in FIG. 1 illustrates the transfer function or its value, wherein a monitoring range 22 for monitoring the transfer function is also shown. From theoretical analysis considerations, as limit value for an erroneous transfer function, a maximum acceptable deviation during the shifting of a gear-ratio step of +/−30 percent has been shown to be advantageous. This maximum acceptable deviation of the transfer function, for example, from a check value, is based on underlying transmission properties such as, for example, the transmission gear ratio, and on vehicle properties such as, for example, empty vehicle weight, driving resistance, etc., wherein, for example, the maximum acceptable deviation can be +/−30 percent of the lockup value. The underlying maximum tolerance threshold should be checked and worked out, for example, for each new transmission development or each new vehicle run. Overall, it can be seen that the transfer function is monitored for a maximum acceptable deviation during the shifting as well as, for example, in a fixed gear.

Figure 2:
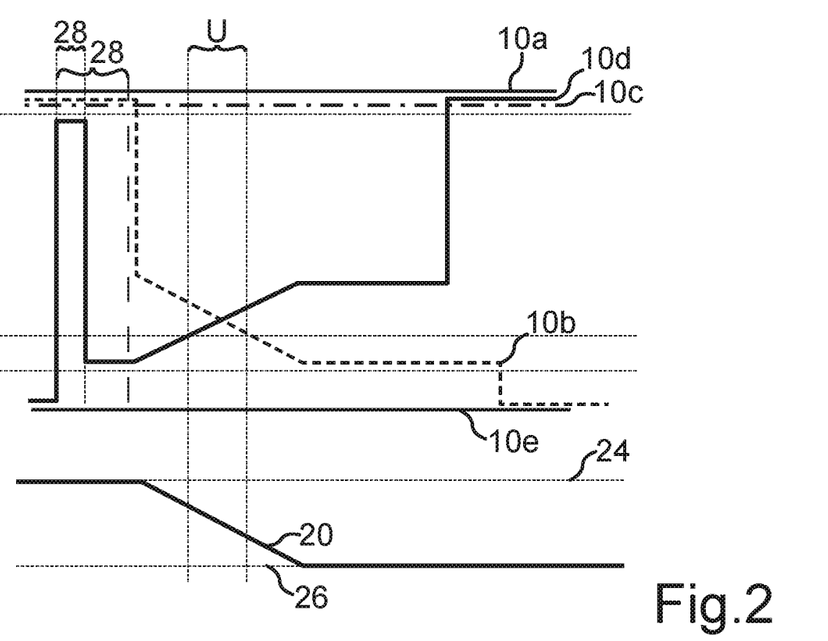
FIG. 2 an additional diagram for illustrating the method.
Figure 3:
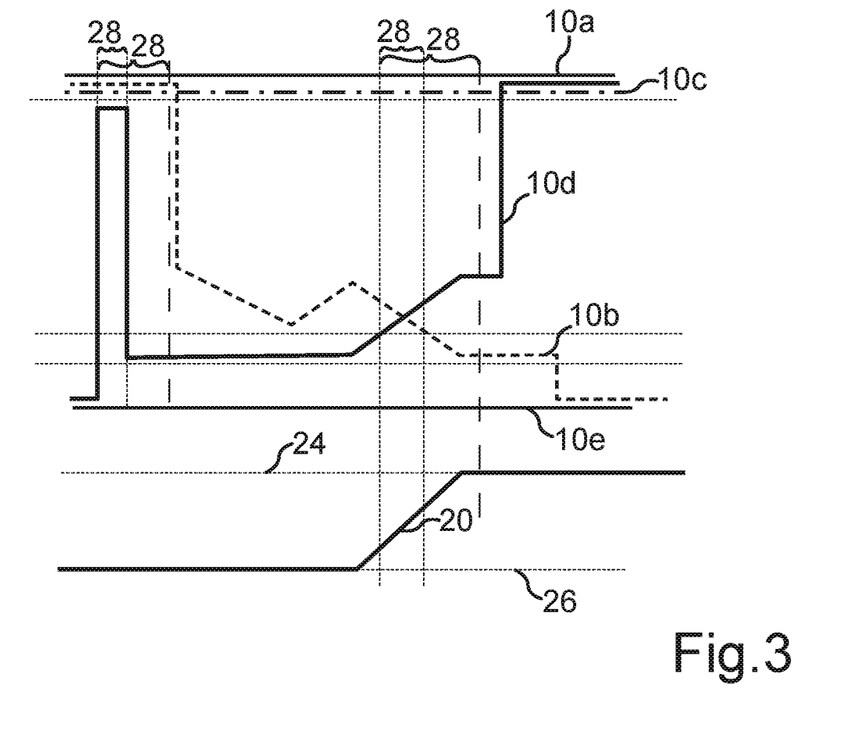
FIG. 3 an additional diagram for illustrating the method.

In particular, a monitoring of the transfer function is provided if the driving occurs in a fixed gear without shifting. Such a driving in a fixed gear without shifting is implemented, for example, just by energizing three of the shifting elements, which can be seen based on the courses 10a-c. Thus, in FIG. 1, the driving in the fixed gear is illustrated. FIG. 2 illustrates, for example, a shifting, in particular a sequential shifting, so that just one gear-ratio step is provided. Furthermore, for example, FIG. 3 illustrates multiple shiftings, so that the gear-ratio step is greater than 1.

In particular, for example, the following underlying assumptions are used: The driving in the fixed gear without shifting is implemented by energizing just three of the shifting elements. During a shifting, more than three shifting elements can briefly participate. During a shifting, for example, two of four shifting elements at most remain energized. For each shifting element, it should be possible to define a lower actual current threshold of the respective valve, which certainly generates no traction. This lower actual current threshold is also referred to as first current limit and it is, for example, the current threshold 12. It should be possible, for each shifting element, to define a second actual current threshold of the valve, which guarantees a transfer of a maximum noncritical torque of, for example, at most 50 Newton meters. This second actual threshold is also referred to, for example, as second current limit, and it is, for example, the current threshold 14. It should be possible to define, for each shifting element, a third actual current threshold, at which the respective shifting element is not in slippage and can transfer proportionally the entire torque of the drive motor. This third actual current threshold is also referred to, for example, as third current limit, and it is, for example, the current threshold 16. Here, for example, sufficient supply of the respective shifting element with the above-mentioned fluid, in particular with oil, is assumed. The respective current limit should be sufficiently robust so that the voltage variations, in particular on a control unit, can weaken. For reasons pertaining to robustness, the monitoring of the transfer function is implemented not on the basis of speed differences, but rather on the basis of the electrical currents of the shifting elements, which are also referred to as valve flow. The background is that, in contrast to a speed-based monitoring, an undesired slippage in the clutch does not necessarily lead to an error detection and consequently to the limitation. The transfer function should be monitored for an unacceptably high deviation from a gear-ratio step in comparison to the actual physical value that is in fact present. The calculation of the transfer function occurs, for example, via the product of converter gear ratio, transmission gear ratio and axle gear ratio, wherein the converter gear ratio is the gear ratio of the hydrodynamic torque converter, the transmission shaft is the gear ratio of the transmission, and the axle gear ratio is the gear ratio of the differential. The monitoring of the transfer function should take into consideration all the variables of the defined total gear ratio.

When driving in the fixed gear, for example, only precisely three shifting elements above the current threshold 16 can be actuated. By means of the current feed pattern, an acceptable gear combination should be determined. In other words, it is possible to determine, as a function of the parameters, and here, for example, as a function of the courses 10a-e, whether and when a particular one of the gears is in fact engaged. This occurs in the context of a gear determination. Thus, for example, by means of the parameter, the currently engaged gear and in particular its gear ratio is used, wherein, for example, the gear ratio is used as the above-mentioned check value. Preferably, the transfer function should not deviate by more than a predeterminable threshold value from the determined gear ratio of the engaged gear, wherein the threshold value is, for example, 30 percent. For example, if a deviation of the transfer function from the transfer ratio of the currently engaged gear is more than the threshold value, then it is concluded that there is an error, in particular of the transfer function. If this error is present, for example, continuously during a timespan, also referred to as error tolerance time (ETT), of 300 milliseconds, for example, then the transfer function, in particular its value, is set or capped or limited to a setpoint value. In FIG. 1, for example, an upper gear ratio 24 and a lower gear ratio 26 are recorded, which are respective limits within which the transfer function should be, so that no error of the transmission function is determined. For example, if the error is present continuously during the error tolerance time, then, for example, the transfer function is capped at the upper gear ratio 24 (upper limit) or at the lower gear ratio 26 (lower limit), in particular as a function of whether the transfer function or its deviation intersects or has intersected the upper or lower limit.

The monitoring of the transfer function should in addition be activated only when at least three current thresholds of the valves are detected as greater than the current threshold 14. Thus, a critical interfering torque in the input or the output is physically possible. For example, if no excessive deviation of the transfer function from the check value, in particular from the value of the determined lowest gear, is detected, so that the transfer function is between the upper and the lower limit, or, for example, if fewer than four current thresholds under the current threshold 14 are detected, the error tolerance time is filtered back.

Furthermore, for example, the transfer function is monitored during shiftings or adaptations, which is illustrated in FIGS. 2 and 3. Here, in FIG. 2, the error tolerance time is recorded and marked with 28. Furthermore, in FIG. 2, the mentioned overlap also referred to as torque overlap is recorded and marked with U. During shiftings or adaptations, just two gears and thus gear ratios should be determined as upper and lower limits (gear ratios 24 and 26) for the shifting process. For the transmission gear ratio without converter influence, for example, the corresponding value based on the gear determination is used. The determined fixed gear ratios form the physical upper and lower limit amounts and accordingly the limits of the monitoring. Here too, for example, the transfer function should deviate at most 30 percent from the determined transfer ratio of the lowest gear. If the deviation exceeds 30 percent of the check value or of the determined transfer ratio of the lowest gear, then an error is present. If this error is present, for example, continuously during the error tolerance time, then after the elapse of the error tolerance time, the transfer function or its value is capped at the upper or lower limit (gear ratio 24 and 26), as a function of whether the deviation or the transfer function has intersected the upper or lower limit.

Here, the monitoring should be activated only when at least three current thresholds of the valves were detected as greater than the current threshold 14. It is only then that a critical interfering torque on the input or output is physically possible. If the deviation exceeds the threshold value and thus, for example, 30 percent of the gear ratio of the determined lowest gear, or if fewer than four current thresholds under the current threshold 14 are detected, then the error tolerance time is filtered back. The respective error tolerance time defines, for example, a monitoring range in which the transfer function is monitored. In particular, that it is provided that a monitoring occurs during the torque overlap and preferably independently of the error tolerance time.

Furthermore, for example, the transfer function is monitored in so-called reversing, that is to when driving in reverse or when shifting into a reverse gear of the transmission. For example, when shifting from a gear designed as forward driving gear or forward driving position into a reverse driving gear or reverse driving position, by means of which a reverse driving of the motor vehicle can be brought about, then the electrical currents and thus the current feed pattern of the shifting elements or of the valves are also determined. Here, a shifting process or a gear change is not possible, since there is only one reverse gear ratio or only one reverse gear. The monitoring of the transfer function is carried out, for example, as when driving in the fixed gear.

An additional state is, for example, a tractionless state, which is provided, for example, in gears or driving positions designated with N or P. In these driving positions, no traction is allowed, wherein, in driving positions designated with D or R, the traction can also be interrupted, thus, for example, during start-stop operation, idling and/or stationary decoupling. Here, for example, fewer than three shifting elements above the current threshold 14 are energized. If this tractionless state is detected, no more than the noncritical torque of, for example, 50 Newton meters can be transferred. Subsequently, the monitoring of the transfer function should be suppressed, and the error tolerance time is filtered back.

An additional state is, for example, an error or a special processing. The hydrodynamic torque converter comprises, for example, a turbine wheel or a turbine and a pump wheel or a pump, wherein the turbine can be driven, for example, hydrodynamically by the pump. The turbine is, for example, associated with a turbine speed sensor, by means of which a speed of the turbine is acquired. In the case of failure of the turbine speed sensor, a fixed gear should be engaged and an additional shifting should be prevented. In this state, the transmission gear ratio should be used without converter influence. For the influence of the torque increase factor of the converter, the maximum value should be assumed in order to implement a reliable operation. For example, if an output speed sensor fails, then a fixed gear should be engaged. In this case, the gear ratio without converter influence should be used. Moreover, for the torque increase factor of the converter, a calculated value from a converter slippage should be used. In the case of failure of the motor speed, a fixed gear should be engaged. In this state, the gear ratio under converter influence should be used. For the influence of the converter movement, the maximum value should be assumed.

If, during a valve failure, for the actuating or actuation of the shifting elements, traction is no longer possible, so that, for example, fewer than three valves of the shifting elements can be energized, then, for example, the monitoring is suppressed. In this case, for example, a qualitative value from the most likely reconnection gear can continue to be transmitted. If more than three valves of the shifting elements are energized above the current threshold 14 for longer than the acceptable error tolerance time, then this leads to a limitation of the degree of freedom of the transmission.

The invention claimed is:

1. A method for operating a drivetrain of a motor vehicle comprising:
    driving a transmission device and at least one wheel by at least one drive motor via the transmission device, in which respective actuations of respective shifting elements of the transmission device are brought about in order to influence thereby a transfer of a torque provided by the drive motor from the drive motor to the wheel via the transmission device,
    setting the torque provided by the drive motor as a function of a transfer function which indicates a factor by which the torque is to be multiplied, in order to calculate a wheel torque resulting from the torque and from the transfer and acting on the wheel;
    determining respective parameters, which characterize respective states of the respective shifting elements, which result from the bringing about of the actuations; and
    monitoring the transfer function as a function of the determined parameters,
    wherein during the monitoring of the transfer function, its value is influenced as a function of the determined parameters, in particular set or limited to a setpoint value,
    wherein the value of the transfer function is influenced if a difference between an actual value and a check value exceeds a predeterminable threshold value.

2. The method according to claim 1, wherein as a function of the determined parameters, at least one check value is determined, with which an actual value of the transfer function is compared.

3. The method according to claim 1, wherein the value of the transfer function is influenced if a time span during which the difference continuously exceeds the threshold value exceeds a predeterminable time limit.

4. The method according to claim 1, wherein as a function of the determined parameters, at least one gear ratio of the transmission device, which results from a gear engaged in the transmission device, is determined.

5. The method according to claim 4, wherein the gear ratio is used as a check value.

6. The method according to claim 1, wherein the monitoring of the transfer function is suspended if the transmission device is incapable of transferring a predeterminable torque.

7. The method according to claim 1, wherein the respective parameter comprises an electric current resulting from the respective bringing about of the respective actuation and flowing through the respective shifting element.

8. The method according to claim 7, wherein the respective shifting element comprises at least one valve.

9. The method according to claim 2, wherein as a function of the determined parameters, at least one gear ratio of the transmission device, which results from a gear engaged in the transmission device, is determined.

* * * * *